United States Patent Office 3,283,350
Patented Nov. 8, 1966

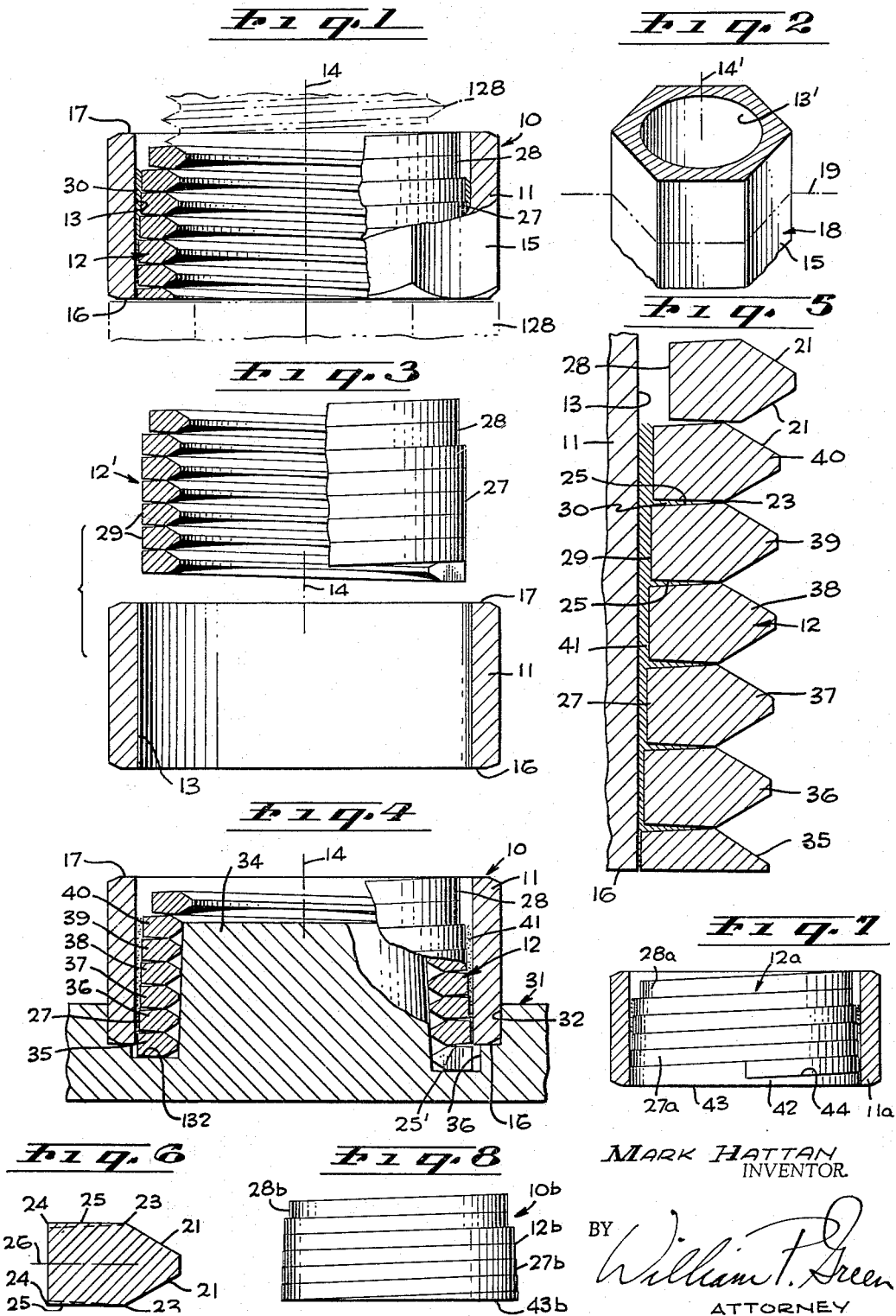

3,283,350
METHOD OF FORMING A LOCK NUT HAVING A HELICALLY COILED THREAD ELEMENT
Mark Hattan, Pasadena, Calif., assignor of sixteen percent to William P. Green, San Marino, Calif.
Filed Dec. 13, 1963, Ser. No. 330,445
10 Claims. (Cl. 10—86)

This invention relates to an improved method for manufacturing self locking threaded elements, and especially nuts having a self locking action. Certain features of structural novelty residing in nuts manufactured in accordance with the present process are disclosed and claimed in my co-pending application Serial Number 319,153, filed October 28, 1963, on "Nut Having Self Locking Action," and now abandoned.

A major object of the invention is to provide a method of manufacturing a self locking element in a manner assuring an optimum combination, in the ultimate element, of completely effective load transmission characteristics, and a very positive and reliable self locking action. A device manufactured in accordance with the invention may be screwed into and out of engagement with a mating threaded part, through many cycles, without substantial loss in locking effectiveness or in load carrying capacity. Further, the present unique method of construction enables manufacture of a nut having these attributes at extremely low cost and by a very simple process.

The thread of the device is formed from an elongated element which is coiled helically so that a portion of this element forms the thread for engagement with a coacting screw or other part. In accordance with the invention, one portion of the element is shaped to serve as a self locking structure, while another portion of the same coiled element acts as the primary load taking portion of the device. To attain the self locking action, the first portion of the coiled element is deformed to a condition in which it does not form a true helical continuation of the main load taking portion of the element, but rather has an interfering fit with a mating screw or other part, to form a frictional lock therewith. Desirably, the coiled element is formed of a resilient material, so that it always tends to return to its normal interfering fit condition, to thus permanently have the desired self locking effect. In order that the other portion of the coiled element may effectively accept and transmit load forces, this portion is bonded in essentially fixed diameter condition, to give the specified portion of the element great hoop strength for accepting the load forces. More specifically, successive turns of the load taking portion of the coiled element may be bonded directly to one another, by brazing, or by a suitable cement or the like. Preferably, the coiled element is contained within an outer case or nut housing, and has the load taking portion of the element bonded tightly to that housing. The self locking portion of the element may attain its self locking action by forming this portion to have a normal diameter which is substantially smaller than the diameter of other turns of the coiled element.

To equalize the division of axial load forces, taken by different turns of the bonded portion of the thread element, I find it desirable to very slightly and gradually reduce the diameter of this portion as it advances axially. Pursuant to the present method, such slightly changing diameters may be produced by first forming the coiled element so that its load transmitting portion has a uniform diameter along its entire length, and then holding these initially uniform diameter turns at slightly different and progressively reducing diameters during the brazing or other bonding step.

When a nut or other threaded element formed by the method of the present invention is tightened against a work structure, it is desirable that forces be transmitted very directly and positively from both the housing or case and the coiled element to the work part. To achieve this result with maximum simplicity of manufacture, I prefer to initially form the coiled element to an axial length somewhat longer than the length which it is to have in the final product, with an end turn of the coiled part initially having a helical end surface facing axially inwardly, and then grinding off or otherwise removing the material at this end surface to form an essentially transverse work engaging shoulder or surface at the end of the element. A substantially transverse and continuous annular shoulder may be formed on the element in this manner by grinding off a portion of the element having an axial thickness at least about as great as the axial lead between corresponding portions of successive turns of the coiled part. During initial brazing of the coiled element within the outer case, the portion of the coiled element which is to be removed (having at least the above specified axial thickness) may project axially beyond the case, so that the coiled element may be ground down to a condition in which it is substantially flush with an end face of the case, without the necessity for removing a large part of the case itself. Thus, both the case and coiled element have end faces which are directly engageable with the work piece in use.

When the successive turns of the load taking portion of the coiled element are bonded together, maximum hoop strength in the ultimate product is attained by locating some of the bonding material directly axially between the successive turns of the element, and particularly between radially outer portions of these turns. A specific feature of the invention relates to a unique manner of forming minute spaces between the turns for receiving this bonding material. More specifically, this result is achieved by so forming the elongated element to be coiled that, upon coiling, its cross section is changed in a manner automatically reducing the axial thickness of the radially outer portion of the element so that bonding material receiving spaces are formed at the desired location.

The above and other features and objects of the invention will be better understood from the following detailed description of the typical embodiments illustrated in the accompanying drawing, in which:

FIG. 1 is a view, partially in axial section, showing a lock nut constructed in accordance with the invention;

FIG. 2 illustrates the manner in which the case of the nut is formed from an elongated piece of metal stock;

FIG. 3 shows the case and the coiled element as they are initially formed;

FIG. 4 represents the brazing operation;

FIG. 5 shows one side of the nut fragmentarily, in axial section;

FIG. 6 shows the initial cross sectional configuration of the thread element before it is coiled;

FIGS. 7 and 8 are views similar to FIG. 1, but showing two variational forms of nuts formed in accordance with the present method.

Referring first to FIG. 1, I have shown at 10 a composite nut manufactured by a method embodying the present invention, and including an outer case or housing 11 and an inner thread element 12. Case 11 is essentially tubular, having a cylindrical inner surface 13 extending along its entire length, and centered about a main axis 14 of the device. Externally, case 11 has a non-circular cross sectional configuration for engagement with a wrench or other tool. For example, the outer surface 15 of casing 11 may be hexagonal as shown, or may have any other desired regular polygonal configuration, desirably continuing along the entire axial extent of the case between axially inner and axially outer planar annular surfaces 16 and 17 which are disposed directly transversely of axis 14.

Case 11 may be formed in extremely simple manner from an elongated piece of tubular metal stock, typically steel, a portion of which is shown at 18 in FIG. 2. This stock has the external hexagonal configuration desired for outer surface 15, and has an inner surface 13′ which is slightly smaller in diameter than surface 13 of FIG. 1. A series of the cases 11 may be formed by merely cutting the stock transversely at a series of locations, in a plurality of planes 19 disposed transversely of the main axis 14′ of the stock, and then reaming or honing the inner bore to a very slightly increased diameter corresponding exactly to that of the desired surface 13.

Element 12 is initially formed as an elongated wire of resilient spring material, such as stainless steel spring wire, and when first formed has the cross section illustrated in full lines in FIG. 6. More particularly this spring wire has a portion 20 at one side which is shaped to form a standard thread cross section, defined by two opposite side surfaces 21 disposed at the usual 60 degrees included angle with respect to one another, and typically having the usual narrow flat surface 22 at the peak of the tread. From locations 23 to 24, the initial cross section of wire 12 forms two parallel planar surfaces 25, which extend parallel to a plane 26 bisecting the thread.

After formation to this initial cross sectional configuration of FIG. 6, with that cross section continuing uniformly along the entire length of element 12, the latter is coiled essentially helically to the condition illustrated at 12′ in FIG. 3. In this condition, the element 12′ has a first portion 27 which is coiled precisely helically at a diameter which may correspond substantially exactly to the diameter of a screw 128 (FIG. 1) with which the nut is to mate. Portion 27 thus has a uniform diameter along its entire length, and in the arrangement of FIG. 3 is typically represented as consisting of five and one-half full turns about axis 14. Upwardly and axially outwardly beyond portion 27 of element 12′, the element has a second portion 28 which is deformed in a manner such that it does not form a true helical continuation of the other turns, in order to have an interfering fit with screw 128. More particularly, portion 28 may typically consist of the upper one and one-half turns of element 12′, and preferably is deformed radially inwardly, to have a substantially reduced effective thread diameter, considerably smaller than the proper size to threadedly engage screw 128. The outer surfaces 29 of portion 27 of element 12′ extend cylindrically about axis 14, and are, in the FIG. 3 condition, at a diameter slightly smaller than the diameter of inner surface 13 of case 11.

The helical coiling of element 12 to the condition represented at 12′ in FIG. 3 causes the radially outer portion of element 12 to be stretched in a manner such that its axial dimension reduces slightly, from the full line condition of FIG. 6 to the broken line condition represented in that figure, in which surfaces 25 have been pulled toward one another to converge as they advance radially outwardly between points 23 and 24. This convergence is brought out clearly in FIG. 5, as is the fact that, due to such convergence of surfaces 25, there are left between successive turns of the element 12 narrow flaring triangularly shaped spaces 30 within which bonding material may be subsequently received.

After formation of the case and coiled element both to the configuration shown in FIG. 3, these parts are assembled together within a suitable fixture such as that represented at 31 in FIG. 4, which fixture may have a hexagonal recess 32 (or a round recess if preferred) for receiving and locating in supported condition the case 11. Fixture 31 may also have a helical ramp surface 132 adapted to engage the lower turn of element 12 and support it in the illustrated position. Projecting upwardly within the interior of element 12, fixture 31 may have a boss or mandrel portion 34, of slightly upwardly tapering frusto-conical shape, and centered about the main axis 14 of nut 10. The outer frusto-conical surface of boss 34 is shaped to maintain the five and one-half turns of portion 27 of the coiled element in very slightly tapering condition, that is, in a condition in which the diameter of portion 27 of the coiled element 12 gradually and very slightly decreases as the element advances progressively upwardly. The lowermost turn 35 of portion 27 of the coiled element is held by fixture 31 in a position in which this turn projects downwardly beyond end surface 16 of case 11, and is supported in its downwardly projecting position by ramp surface 132 within a recess 36 in fixture 31. Stated differently, the element 12 continues downwardly, beyond the point at which its undersurface 25 is aligned with undersurface 16 of the case (point 25′ in FIG. 4), through an axial distance therebeyond at least as great as the axial lead between corresponding portions of successive turns of element 12. The turns 36, 37, 38, 39 and 40 gradually decrease very slightly in diameter, with each turn desirably being about two or three ten thousandths of an inch smaller in diameter than the preceding one, and with the uppermost full turn of initially uniform diameter portion 27 desirably being held by boss or mandrel 34 in a diameter corresponding exactly to that of a standard thread designed to mate with screw 128. The turns beneath turn 40 are thus preferably very slightly oversize, to an extent equalizing the load transmitted to these turns from a screw of uniform diameter. Boss 34 does not reach the location of the upper portion 28 of element 12, and therefore does not affect the diameter of these turns.

While the parts are held in the condition of FIG. 4, portion 27 of element 12 is rigidly and permanently bonded to case 11, by bonding material represented at 41. This bonding material may be located in the device in any suitable manner, as by application to the inner surface of case 11 prior to insertion of element 12 therein, or as by insertion of a suitable ring of bonding material in the case or about element 12. The bonding material is preferably a brazing material chosen to bond tightly to the metal casing 11 and spring metal part 12, but may also be a suitable resinous plastic cement, such as an epoxy cement or the like. Bonding material 41 adheres tightly to the inner surface 13 of case 11, and the outer surfaces 29 of portion 27 of element 12, and also flows radially inwardly into the narrow triangularly shaped spaces 30 (FIG. 5) between successive turns of the portion 27 of element 12. Engagement of these successive turns helically at the location of points 23 in FIGS. 5 and 6 prevents flow of the bonding material radially inwardly beyond these points 23, to thus prevent damage to the thread surfaces themselves. The bonding material adheres directly to all contacted surfaces of the thread element, including the surfaces 25, to permanently and rigidly secure successive turns of portion 27 of element 12 together and to case 11, and to do so in a manner retaining the turns of this portion 27 in their slightly decreasing diameter condition.

After the brazing or other bonding operation, the composite nut, including parts 11 and 12, is removed from fixture 31, and is then placed in a grinding or cutting tool which acts to remove the axially inwardly projecting portion of inner turn 35 of element 12 to the condition of FIG. 1. More particularly, the end turn of element 12 is ground off in the plane of undersurface 16 of case 11, to form a bottom transverse planar surface of element 12 which coacts with surface 16 of the case in transmitting load forces to a work piece. The prior brazing or bonding of element 12 in fixed position within the case assures positive retention of the element 12 in a manner such that the grinding operation can be performed effectively.

The slight difference in diameter between successive turns of portion 27 is substantially less than the difference in diameter between the upper self locking turns 28 and the nearest turn 40 of portion 27. For example, in a ¾–16 nut, portion 28 may be twenty thousandths of an inch smaller in diameter than upper turn 40 of portion 27, while the various successive turns of portion 27 may themselves differ only by approximately two or three ten thousandths in diameter, as previously stated.

In using the nut of FIGS. 1 through 6, after formation in the above discussed manner, the nut is screwed onto a screw 128 with the lower end of the nut as seen in FIG. 1 being its leading end. That is, the lower turn in FIG. 1 is first screwed onto the mating threaded element, and the other turns then move successively onto the screw until ultimately the top portion 28 advances onto it. This top portion 28 is substantially smaller in diameter than the threads of the screw 128 and therefore must be expanded radially outwardly against its own resilience by the screw, to thus attain a frictional lock acting to retain the screw and nut against accidental unscrewing rotation. Upper turn 40 of the portion 27 fits the screw threads precisely, while the turns therebelow are slightly oversize to overcome the usual tendency for the lowermost turn or turns to take more than their proper share of the axial load imparted by a mating screw. The difference in diameters of successive turns of portion 27 is just such as to exactly equalize the axial load forces taken by the different turns of portion 27, when they engage successive turns of a uniform diameter screw, to thus maximize the load taking characteristics of the overall nut structure.

When it is desired to remove the nut from the screw, this may be accomplished by merely exerting an increased unscrewing torque on the nut, and as soon as portion 28 of the coiled element moves out of engagement with the screw, this portion will return resiliently to its initial reduced diameter condition, in preparation for a next successive use. The nut may be screwed onto and off of the mating threaded element many times without loss of the load taking characteristics or self locking capacity.

FIG. 7 shows a variational form of nut formed in accordance with the present method, which includes a case 11a which may correspond to case 11 of the first form, and an inner threaded element 12a which may correspond with element 12 except that its inner end, instead of being ground off, rests on a supporting ramp part 42. This ramp is formed separately from element 12a, and has a transverse inner end surface 43, lying in the same transverse plane as the inner end surface 16a of the case, and a helical ramp surface 44 which is shaped to exactly mate with and substantially engage the inner helical end surface of the end turn of element 12a. The element 12a may have a first series of turns 27a which progressively decrease very slightly in diameter, and an upper portion 28a (typically one and one-half turns) which is substantially reduced in diameter to attain the self locking action of portion 28 in the first form of the invention. The various turns of portion 27a of element 12a are brazed or otherwise bonded directly to one another and to case 11a, and ramp 42 is also brazed or otherwise bonded to the end turn of element 12a and to case 11a. Portion 28a is of course left free of any bonding attachment to the case or between successive turns of element 12a, to be free for expansion and contraction as is portion 28 of FIGS. 1 through 6. In use, the device of FIG. 7 functions in basically the same manner as the first form of the invention.

FIG. 8 shows another form of device 10b whose manufacture embodies some features of the invention. This device includes a coiled spring element 12b which may be the same as element 12 of FIG. 1, but which has no outer case. The various turns of its portion 27b are brazed together by brazing material received therebetween, and with these turns held by a boss such as element 34 of FIG. 4 in slightly decreasing diameter conditions during the brazing. Upper reduced diameter portion 28b is not brazed, and acts as a self locking structure. The coiled element is initially formed to the condition of FIG. 3, then brazed while held in the condition of FIG. 4, and its end is then ground off to form an axially inner transverse work engaging surface 43b.

In any of the forms of the invention, instead of using a slightly conical positioning boss as shown at 34 in FIG. 4, I may use an externally threaded boss or mandrel, having threads which gradually taper upwardly to hold the lower portion of the coiled element even more positively in its proper slightly tapering condition. Also, it is contemplated that the boss may if desired be eliminated completely, with the lower portion of the coiled element being held in tapered condition during brazing by appropriately tapering the inner surface of case 11 itself.

I claim:

1. The method of forming a lock nut that includes providing an essentially helically coiled elongated resilient element forming a thread at its inner side threadedly engageable with a mating screw, said element having a first portion of more than one turn shaped to essentially fit the screw and having an effective internal diameter which is uniform for a plurality of turns, said element having a second portion which is distorted sufficiently to have an interference fit with the screw and thereby attain a self locking action therewith, bonding successive turns of said first portion together to retain them against expansion for load bearing engagement with the screw, holding said first portion during said bonding in a condition in which the diameter thereof decreases very slightly in an axial direction, to be retained in that condition by the bonding, and leaving said second portion free of such bonded attachment of one turn to an adjacent turn and free for resilient deformation by the screw for interfering engagement therewith.

2. The method of forming a lock nut that comprises providing an elongated element having a thread cross section and having two essentially parallel opposite side surfaces, winding said element essentially helically to form an internal thread at a radially inner side thereof, and with a first portion of the element at one uniform diameter and a second portion at a sufficiently reduced diameter to provide an interference fit with a screw mating with the first portion, stretching the material of said element near the radially outer side thereof by said winding and thereby reducing its axial thickness toward said outer side in a manner causing said essentially parallel surfaces to converge radially outwardly toward one another and thereby leave a flaring space between successive turns of the element, applying bonding material within said space and between said successive turns of said first portion and bonding it to said turns to secure them in essentially fixed diameter conditions, and maintaining said successive turns of the first portion during said bonding at different diameters which decrease very slightly as they advance axially toward said second portion for retention by the bonding at said different diameters.

3. The method of forming a lock nut that includes providing an essentially helically coiled elongated resilient element forming a thread at its inner side threadedly engageable with a mating screw, said element having a first portion shaped to essentially fit the screw, and having a second portion which is distorted sufficiently to have an interference fit with the screw and thereby attain a self locking action therewith, said element having a third portion forming at least the major portion of a turn at an axially inner end thereof, positioning at least said first portion of the coiled element within a passage in a case, bonding said first portion of the element to said case, leaving said second portion free of such bonded attachment directly to the case and free for resilient deformation by the screw for interfering self locking engagement therewith, and then removing material of said third portion to form an essentially transverse end work engaging surface on the element.

4. The method of forming a lock nut that includes providing an essentially helically coiled elongated resilient element forming a thread at its inner side threadedly engageable with a mating screw, said element having a first portion shaped to essentially fit the screw, and having a second portion which is distorted sufficiently to have an interference fit with the screw and thereby attain a self locking action therewith, said element having a third portion forming at least the major portion of a turn at an axially inner end thereof, positioning at least said first portion of the coiled element within a passage in a case with said third portion of the element projecting axially from and beyond said case, bonding said first portion of the element to said case, leaving said second portion free of such bonded attachment directly to the case and free for resilient deformation by the screw for interfering self locking engagement therewith, and then removing material of said projecting third portion of the coiled element to form an essentially transverse end work engaging surface.

5. The method of forming a lock nut that includes providing an essentially helically coiled elongated resilient element forming a thread at its inner side threadedly engageable with a mating screw, said element having a first portion of a plurality of turns shaped to essentially fit the screw, and having a second portion which is distorted sufficiently to resiliently assume a position having an interference fit with the screw and to thereby attain a self locking action with the screw, positioning said coiled element within a passage in an essentially tubular case, bonding said turns of said first portion to said case and in fixed positions therein to retain said turns of the first portion against radial expansion or radial constriction or axial shifting movement relative to one another or relative to the case and in positions for load bearing engagement with the screw, and leaving said second portion of said element free of bonded attachment to said case and free for resilient deformation by the screw relative to the case and relative to said first portion of said element for interfering self locking engagement with the screw.

6. The method of forming a lock nut as recited in claim 5, in which said bonding step retains successive turns of said first portion of said element essentially rigidly at diameters which decrease very slightly as said element advances axially but with the dimensional differences between successive turns of said first portion being small as compared with the dimensional differences between each turn of said first portion and said resiliently deformable second portion.

7. The method of forming a lock nut that includes providing an essentially helically coiled elongated resilient element forming a thread at its inner side threadedly engageable with a mating screw, said element having a first portion of a plurality of turns shaped to essentially fit the screw, and having a second portion which is distorted sufficiently to resiliently assume a position having an interference fit with the screw and to thereby attain a self locking action with the screw, positioning said coiled element within a passage in an essentially tubular case, bonding successive turns of said first portion to one another and to said case to retain said turns of the first portion against radial expansion or radial constriction or axial shifting movement relative to one another or relative to the case and in positions for load bearing engagement with the screw, leaving said second portion of said element free of such bonded attachment of one turn to an adjacent turn or to said case and free for resilient deformation by the screw relative to the case and relative to said first portion of said element for interfering self locking engagement with the screw, said first portion of said element terminating at an end turn which projects beyond an end of said case and which, during said bonding step, is bonded essentially rigidly to an adjacent turn and is of essentially uniform cross section to its extremity and therefore forms an essentially helical end surface of the element beyond the case, and then removing material from said end turn after said bonding to form an essentially transverse end work engaging surface in lieu of said helical surface and which is more closely flush than said helical surface with respect to said case.

8. The method of forming a lock nut that comprises providing an elongated element having a thread cross section, winding said element essentially helically to form an internal thread at a radially inner side thereof, with a first portion of said element consisting of a series of several turns at a first uniform diameter, and a second portion axially beyond said first portion at a substantially reduced diameter for interfering self locking engagement with a screw, positioning said element within a passage in a case having an essentially smooth unthreaded essentially axially extending side wall, with an axially inner end turn of said first portion projecting axially inwardly beyond said case, distorting said first portion of the element so that a plurality of said initially uniform diameter turns thereof within the case have diameters which are slightly different but all of which are substantially greater than the diameter of said second portion, bonding said turns of slightly different diameters rigidly to one another and to said case and to said inner turn, leaving said second portion free of such bonded attachment between adjacent turns and to said case and therefore free for resilient self locking expansion by a screw, and then removing material from said axially projecting inner end turn of said first portion to form a surface on said end turn which is substantially flush with the case, and disposed essentially transversely of the case and element.

9. The method of forming a lock nut that includes providing an essentially helically coiled elongated resilient element forming a thread at its inner side threadedly engageable with a mating screw, said element having a first portion of a plurality of turns shaped to essentially fit the screw, and having a second portion which is distorted sufficiently to resiliently assume a position having an interference fit with the screw and to thereby attain a self locking action with the screw, bonding successive turns of said first portion in essentially rigidly fixed positions relative to one another and against radial expansion or radial constriction or axial displacement of one turn relative to another, leaving said second portion free of such bonded retention in rigidly fixed position and free for resilient deformation by the screw for interfering engagement therewith, said bonding step retaining successive turns of said first portion of said element essentially rigidly at diameters which decrease very slightly as said element advances axially, but with the dimensional differences between successive turns of said first portion being small as compared with the dimensional differences between each turn of said first portion and said resiliently deformable second portion.

10. The method of forming a lock nut that includes providing an essentially helically coiled elongated resilient element forming a thread at its inner side threadedly engageable with a mating screw, said element having a first portion of a plurality of turns shaped to essentially fit the screw, and having a second portion which is distorted sufficiently to resiliently assume a position having an interference fit with the screw and to thereby attain a self locking action with the screw, bonding successive turns of said first portion in essentially rigidly fixed positions relative to one another and against radial expansion or radial constriction or axial displacement of one turn relative to another, leaving said second portion free of such bonded retention in rigidly fixed position and free for resilient deformation by the screw for interfering engagement therewith, said first portion of said element terminating at an end turn which, during said bonding step, is bonded in essentially rigidly fixed position relative to an adjacent turn and is of essentially uniform cross section to its extremity and therefore forms an essentially helical end surface of the element, and then removing material from said end turn after said bonding to form an essentially transverse end work engaging surface in lieu of said helical surface.

References Cited by the Examiner

UNITED STATES PATENTS

| | | | |
|---|---|---|---|
| 2,210,353 | 8/1940 | Barnes | 85—32 |
| 2,363,663 | 11/1944 | Findley | 85—46 |
| 2,407,879 | 9/1946 | Haas | 85—32 |
| 2,439,687 | 4/1948 | Findley | 85—32 |
| 2,755,699 | 7/1956 | Forster | 151—14 |
| 3,039,507 | 6/1962 | Hattan | 151—14 |

ANDREW R. JUHASZ, *Primary Examiner.*

CARL W. TOMLIN, *Examiner.*

R. S. BRITTS, *Assistant Examiner.*